(12) United States Patent
Harris

(10) Patent No.: US 8,972,383 B2
(45) Date of Patent: Mar. 3, 2015

(54) METHOD OF PROVIDING AN INTERACTIVE ENTERTAINMENT SYSTEM

(71) Applicant: Joel R. Harris, Chicago, IL (US)

(72) Inventor: Joel R. Harris, Chicago, IL (US)

( * ) Notice: Subject to any disclaimer, the term of this patent is extended or adjusted under 35 U.S.C. 154(b) by 0 days.

(21) Appl. No.: 14/049,446

(22) Filed: Oct. 9, 2013

(65) Prior Publication Data

US 2014/0038728 A1 Feb. 6, 2014

Related U.S. Application Data

(63) Continuation of application No. 13/150,667, filed on Jun. 1, 2011, now Pat. No. 8,595,216.

(60) Provisional application No. 61/351,384, filed on Jun. 4, 2010.

(51) Int. Cl.
*G06F 17/30* (2006.01)
*A63F 13/30* (2014.01)

(52) U.S. Cl.
CPC ............ *A63F 13/12* (2013.01); *G06F 17/3005* (2013.01)
USPC .......................................... 707/717; 715/764

(58) Field of Classification Search
None
See application file for complete search history.

(56) References Cited

U.S. PATENT DOCUMENTS

| | | | |
|---|---|---|---|
| 2002/0124048 A1* | 9/2002 | Zhou ............................. | 709/203 |
| 2003/0048308 A1* | 3/2003 | Friedlander ................... | 345/810 |
| 2007/0118801 A1* | 5/2007 | Harshbarger et al. ......... | 715/730 |
| 2008/0102422 A1* | 5/2008 | Hayes et al. .................. | 434/107 |
| 2008/0201156 A1* | 8/2008 | Abhyanker ...................... | 705/1 |
| 2008/0256066 A1* | 10/2008 | Zuckerman et al. ............. | 707/5 |
| 2008/0276188 A1* | 11/2008 | Zerger .......................... | 715/764 |
| 2010/0017718 A1* | 1/2010 | Bohms .......................... | 715/719 |
| 2010/0042511 A1* | 2/2010 | Sundaresan et al. ............ | 705/26 |
| 2010/0151851 A1* | 6/2010 | Bhatia et al. .................. | 455/425 |
| 2010/0161384 A1* | 6/2010 | Wells ............................. | 705/10 |

* cited by examiner

*Primary Examiner* — Wilson Lee
(74) *Attorney, Agent, or Firm* — Mark S. Leonardo; Catherine S. Feldman; Brown Rudnick LLP

(57) ABSTRACT

This invention relates generally to an interactive entertainment system that provides at least two discrete, independent stories that are interactively intertwined through a variety of online or other interactive media whereby the user of the interactive entertainment system can participate by commenting, by contributing materials (in visual, photographic, video, audio, tactile or other sensory and cognitive formats), by responding to quizzes and polls, and by otherwise interacting with other users of the interactive entertainment system, or with characters in any story, as if the latter were real persons.

22 Claims, 2 Drawing Sheets

METHOD OF PROVIDING AN INTERACTIVE ENTERTAINMENT SYSTEM

CROSS-REFERENCE TO RELATED APPLICATION

This application is a continuation of U.S. Non-Provisional application Ser. No. 13/150,667, filed Jun. 1, 2011, which claims the benefit of and priority to U.S. Provisional Application No. 61/351,384, Jun. 4, 2010. The entirety of each of these applications is hereby incorporated by reference.

TECHNICAL FIELD

This invention relates generally to an interactive entertainment system that provides at least two discrete, independent stories that may be fiction or non-fiction and that are interactively intertwined through a variety of online or other interactive media whereby the user of the interactive entertainment system has the opportunity to participate by commenting, by contributing materials (in visual, photographic, video, audio, tactile, or other sensory and cognitive formats), by responding to quizzes and polls, and by otherwise interacting with, and experiencing the participation of, other users of the interactive entertainment system and with character(s) in one or more of the stories (as if the characters were real people).

BACKGROUND

Games, toys, play structures, and other similar entertainment systems are well known for providing play and interaction among users, whether children or adults. A variety of commercially available play toys, stories, and games are also known for providing valuable learning as well as entertainment opportunities for children and adults, such as role playing, reading, memory stimulation, physical coordination, and the like.

While there are many games, stories, and toys that provide for participants to choose their own ending to a story and for multiplayer online games in which several participants engage in an entertainment system simultaneously and affect one another's experience, there is a lack in the industry of an entertainment system that allows users to follow the individual character(s) of one or more stories within a larger whole involving interwoven stories, to provide feedback regarding, and otherwise engage with, the stories, to interact directly with one or more characters of the stories (as if the characters were real people), to interact with other users and to potentially alter the story of one or more particular characters. Users will be able to communicate with the characters as if the characters were real people. Therefore, a need exists for an online computer or other interactive medium format that provides both an individual entertainment experience (through each user reading and potentially interacting with, in one or more of the ways outlined above, one or more stories within the system with the opportunity to participate in the game component of the entertainment) and a multi-participant experience, whereby users can communicate with one another in various ways and can view the results of other users' participation, and the impact of that participation on individual stories.

SUMMARY OF THE INVENTION

This invention is directed to an interactive entertainment system that is characterized by a multi-faceted presentation of several stories through a wide range of media. Each story may be fiction, non-fiction or some combination of fiction and non-fiction. The interactive entertainment system may include written, audio, still visuals, animation, video, tactile, olfactory, and other sensory or cognitive means of presentation both of the story content and of the feedback from the users, and includes various online media, e.g. computer, cellphones, still and motion picture camera, sound recording, and other means and modes of communication.

In one aspect according to the invention, the invention relates to a method, implemented on an interactive entertainment system, for presenting an at least two discrete, independent stories that are interactively intertwined, the method includes uploading an at least two intertwined stories via a content input interface, wherein the at least two stories are made up of a plurality of individual communication units, wherein the at least two stories are two discrete and independent stories that are interactively intertwined. The method further includes storing the plurality of communication units related to the at least two stories in a content database, presenting to a user the at least two stories via a user interface, and receiving a user-feedback from the user via the user interface for any of the at least two stories. The method further includes entering the user-feedback into the content database, providing the user-feedback to a content creator via a feedback interface and uploading an at least one enrichment to an at least one story, wherein the enrichment is based upon the user-feedback.

In one embodiment according to this aspect of the invention, the at least two stories are first-person narratives of individual protagonists of the at least two intertwined stories.

In another embodiment according to this aspect of the invention, the user interface transmits information via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

In another embodiment according to this aspect of the invention, the feedback interface transmits information via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

In another embodiment according to this aspect of the invention, the method further includes intertwining an at least one story with an at least one other story, wherein an at least one character from the at least one story sends an at least one individual communication unit to an at least one other character in the at least one other story. In this embodiment, the at least one individual communication unit is transmitted via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

In another embodiment according to this aspect of the invention, the uploading of the plurality of individual communication units occurs at one or more time points.

In another embodiment according to this aspect of the invention, the method, implemented in a computing system, for presenting at least two discrete, independent stories that are interactively intertwined is repeated more than one time.

In another embodiment according to this aspect of the invention, the method further includes providing the user-feedback from a user. In this embodiment of the invention, the content creator edits the user-feedback from the user prior to providing the user-feedback to the subsequent user. In this embodiment of the invention, the subsequent user responds to the enriched story that includes the user-feedback by providing an additional user-feedback.

In another embodiment according to this aspect of the invention, the method further includes providing a story enhancement to the at least one story based upon the user-feedback.

In another embodiment according to this aspect of the invention, the method further includes providing a plot-advancing communication unit, wherein the plot-advancing communication unit is transmitted via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

In a second aspect of the invention, the invention relates to a method, implemented on an interactive entertainment system, for providing an enriched experience of presenting a multi-story game to a user, the method including providing a first content database for storing and transmitting a plot-advancing communication unit, wherein the at least two stories are two discrete and independent stories that are interactively intertwined, and wherein the plot-advancing communication unit is related to one or more of the at least two stories. The method further includes transmitting the plot-advancing communication unit from a content creator to the first content database via a content input interface, transmitting the plot-advancing communication unit from the first content database to a user via a user interface, and providing a second content database for receiving a user-feedback, wherein the user transmits the user-feedback via a user interface. The method further includes providing a feedback interface for processing the user-feedback from the second database by the content creator, providing a story enrichment communication unit regarding an at least one story based upon the user-feedback, wherein the content creator transmits the story enrichment communication unit via a content input interface to the first database, and transmitting the story enrichment communication unit to the user via a user interface.

In one embodiment according to this aspect of the invention, the method further includes transmitting the stored information about the at least two stories from the first content database to a user that uses the interactive entertainment system after a first transmission of the plot-advancing communication unit.

In another embodiment according to this aspect of the invention, the user interface transmits information from the first content database via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel. In another embodiment according to this aspect of the invention, the user transmits the user-feedback from the user to the second content database via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

In another embodiment according to this aspect of the invention, the user receives an acknowledgment for the submission of the user-feedback to the user interface.

DETAILED DESCRIPTION

Figure 1:
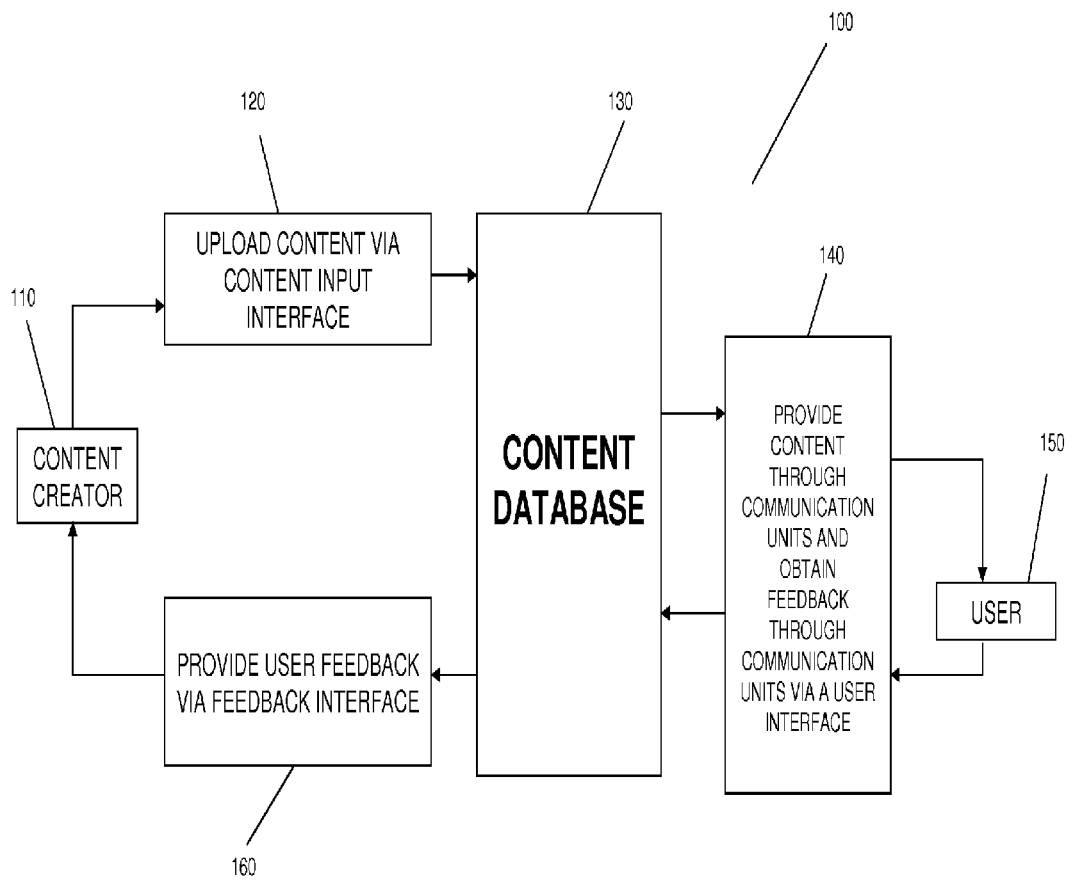
FIG. 1 is a block diagram of an embodiment of a method, implemented on an interactive entertainment system, for presenting at least two discrete, independent stories that are interactively intertwined.

In general, the present invention provides that each story included in the interactive entertainment system can be accessed in at least one computing system format, such as cellular phones, mobile Internet, and standard computers. A story may be fiction, non-fiction or some combination of fiction and non-fiction. A user receives both plot-advancing and additional interactive entertainment system-related communication units that are conveyed to the user via transmissions such as, for example, a text message; a visual cell phone transmission; a blog; a micro-blog; a written, graphic, photographic, or other work of visual art; audio or video posting on a webpage; participation in an interactive activity via a webpage, via a cell phone response, via a phone-in response to a television transmission, via a two-way auditory transmission; a posting on a social networking website; a video posted on a website transmitted by a television channel or transmitted by cell phone; or an audio transmission posted on a website transmitted by a television channel, transmitted by a radio channel, transmitted by two-way auditory transmission. Plot-advancing communication units include communication units which move a story forward in terms of the development of the plot, as distinguished from other communication units which may digress into areas of interest of users and/or characters but which do not contribute to the development of the story's plot.

Participation in an interactive activity includes engagement in activities such as the following: communicating with a character in a story in the interactive entertainment system, communicating with another user of the interactive entertainment system, engaging in joint activities with one or more other users of the interactive entertainment system, responding to a quiz or a poll, entering a contest, making a virtual purchase, creating and/or embellishing a personal avatar, or otherwise participating in any interactive entertainment system-related virtual or actual activity available to a user, including attendance at virtual or actual events.

A communication unit is the information provided at one time through one type of medium. For example, a written communication by micro-blog or text message constitutes a communication unit; equally a photograph, sound recording or video presentation on a website or sent to a cell phone constitutes a communication unit. A character may be a protagonist; however, a character may also be a non-protagonist.

Once a story has been in existence long enough for a number of communication units to be available, users may select how they would like to follow a character's story, thus providing each user the opportunity to have a unique and individualized experience with each interactive story. For instance, if users join the interactive entertainment system after one or more stories have already progressed and wish to understand some of the previous events, plot twists and enrichment based on other users' input, they can explore previously posted communication units in any order they choose, even though what they experience would not necessarily be temporally sequential. Certain previously posted communication units that enable a late-entering user to catch up may also be available through one or more media such as a website displaying aspects of the interactive entertainment system, an online Twitter or similar micro-blog site, online in an audio format or any other computerized format that may be suitable to update the user on what they have missed. The interactive entertainment system may also have a summary "catch-up" mechanism that provides an abbreviated overview of a story to date that may be available through one or more media such as a computer website or mobile internet site, a character's social network site or online in an audio format or any other computerized format that may be suitable.

Alternatively, the user may wish to follow a chain of interaction among different story characters and other users related to a particular topic that may follow the main plot or may be a diversion from the main plot development, to character relationships, to character's motives or to discovering clues, solutions or answers to unresolved issues or unanswered questions within a particular story or at least two intertwining stories. Intertwining stories are two or more independent, discrete stories in which one or more characters from one story communicate with one or more characters from one or more of the other stories, so that characters can communicate with one another across separate stories regarding story elements from any of the stories in which they are involved. In another alternative, a user may choose to follow one or more stories in a temporally sequential fashion.

Further, the interactive entertainment system enables users to participate in the story to whatever degree they choose. As an incentive to participate, users are rewarded for their participation and contributions. Users can, for example, engage with and respond to characters' micro-blog postings, blogs and social networking pages, include characters among their social networking site friends, download images from the interactive entertainment system onto their own social networking pages, respond to polls related to issues in one or more stories, answer quizzes that demonstrate commonalities between the users and the characters, communicate with another user of the interactive entertainment system, engage in joint activities with one or more other users of the interactive entertainment system, enter a contest, make a virtual purchase, create and/or embellish a user's personal avatar, or otherwise participate in any interactive entertainment system-related virtual or actual activity available to a user, including attendance at virtual or actual events.

The user's participation may provide them with rewards that enable them to participate in other ways. One of the rewards for participation may be to receive additional information that is not part of the generally available story, and would be sent directly to that user through a personalized medium such as email, text message or cell phone message.

Each character with an active communication presence presents his, hers, or its experiences in the form of a "first-person" narrative so the interactive entertainment system constitutes a multiply-threaded set of such narratives, all of which intertwine with one another, as the characters respond to each other's blogs, tweets, and other communication units in real time. A character with an active communication presence is a character that sends out at least one communication unit; a character without an active communication presence is a character included in the story that does not send out any communication units. Additionally, third-person communication units, such as mock news stories or real weather information for geographic locations relevant to a particular story, may be transmitted as related to one or more stories.

Individual character's online postings on user interfaces other than on the interactive entertainment system, such as micro-blog postings on sites such as Twitter or postings on a social networking site, will also be reproduced on, or linked to, the interactive entertainment system, through, for example RSS feeds under current technology, although this may change with new technological advances. The interactive entertainment system includes links to the individual character's blog sites, to a character's social networking site pages, and to visual and audio material on other sites. Audio versions of the written communication units as well as related music, sound, tactile, olfactory, or other sensory and cognitive messaging for plot development may also be provided by the interactive entertainment system.

As the stories progress, users receive user-based and content-creator story enrichment communication units. Story enrichment units include content reflecting user-feedback; communication units from one character to another, impacting both character's stories; or real or mock third-party information (such as a mock news story) about a specific character or affecting one or more stories. Story enrichment can be presented in written, audio, photographic, graphic, animation, and/or video formats.

Communication units from one character to another can be transmitted by various media, such as the characters' individual blogs; the characters' "tweets" (i.e., short micro-blog messages on Twitter or similar sites); mock "instant messaging" communications such as those on Gmail; postings on characters' pages on social networking sites, videos and graphics (such as slide presentations) posted on YouTube-.com and similar video-sharing websites or transmitted on a television channel, or audio (such as "found sounds") and music posted on audio-sharing websites, transmitted by a television channel, transmitted by a radio channel, or transmitted by two-way auditory transmission Once a user provides initial content via a communication unit, and that content is edited and subsequently uploaded, it is available—visually, auditorily, or sensorily (depending on the type of communication unit provided by that user)—to all subsequent users. Once a user initially responds to a participation activity such as a poll, the result of that participation is available to subsequent users. Subsequent to the initial user who provided content via a communication unit or other information via a participatory activity, each later user therefore experiences an enriched experience to which that later user will have the opportunity to respond. Each subsequent user who also provides content via one of these modalities further enriches the experience of users subsequent to that user. The method also includes feedback contributed by the content creator as if it were communicated by one character to another character in two intertwining stories within the interactive entertainment system. This content creator-generated "character" feedback includes responding to feedback from one or more users as well as responding to previous content creator-generated "character" communication. This process of communication and response is ongoing so that there is a continuing feedback loop of information being entered into the interactive entertainment system.

Referring to FIG. 1, in one embodiment of the invention, a method 100 implemented on an interactive entertainment system, for presenting at least two discrete, independent stories that are interactively intertwined is shown. According to the method, a content creator 110 uploads content via a content input interface 120. The content is stored in a content database 130. According to the invention, content includes content creator-generated plot advancing and other communication units. User feedback in the form of communication units approved by the content creator 110, results of polls and quizzes, or any other information to enrich the entire interactive entertainment system. The content can be stored as individual communication units. Individual communication units include anything communicated by a form of media, such as, for example, a sound, a written message, a photograph, a video, a recording, or a micro-blog.

When a user 150 chooses to participate in the story, the user accesses participation opportunities through a user interface 140 which may be on any medium (such as, for example, the interactive entertainment system computer website or its mobile Internet website, a character social networking page, a video-sharing website) that provides communication units from one or more stories from the content database 130 to the user 150. If the user 150 wishes to provide any feedback regarding one or more stories, or any other aspect of any story or individual character, or if the user 150 participates in any participation activity such as a poll or quiz or virtual store, they provide feedback to the content database 130 via a user interface 140. The user may submit feedback or access story communication units via any medium of transmission that is relevant to the type of communication unit being transmitted, such as, for example, via a text message, a visual cell phone transmission, a blog, a micro-blog, a posting on a webpage, participation in an interactive activity on a webpage, a posting on a social networking website, a video on a video sharing website or an audio recording on an audio-sharing website.

The content database 130 then provides the user feedback to the content creator 110 via a feedback interface 160 for the content creator 110 to review and decide to provide to other users (in the case of written, visual or auditory material related to a character or a story), to aggregate in order to provide summary information (in the case of responses to polls and quizzes, for example) or to implement (in the case of a virtual purchase or an embellishment of a user avatar, for example.) The user-feedback is initially stored in the content database 130 and is subject to an editorial process by the content creator 110 that includes content approval and possible editing and tools for aggregation by an entertainment system manager.

The content creator 110 may alter one or more stories based upon user feedback and may upload new communication units providing narrative twists to the story, additional character development, or any other story enrichment via the content input interface 120 to the content database 130 for further distribution to a user 150. Communication units may be repeatedly provided to a user 150.

Figure 2:
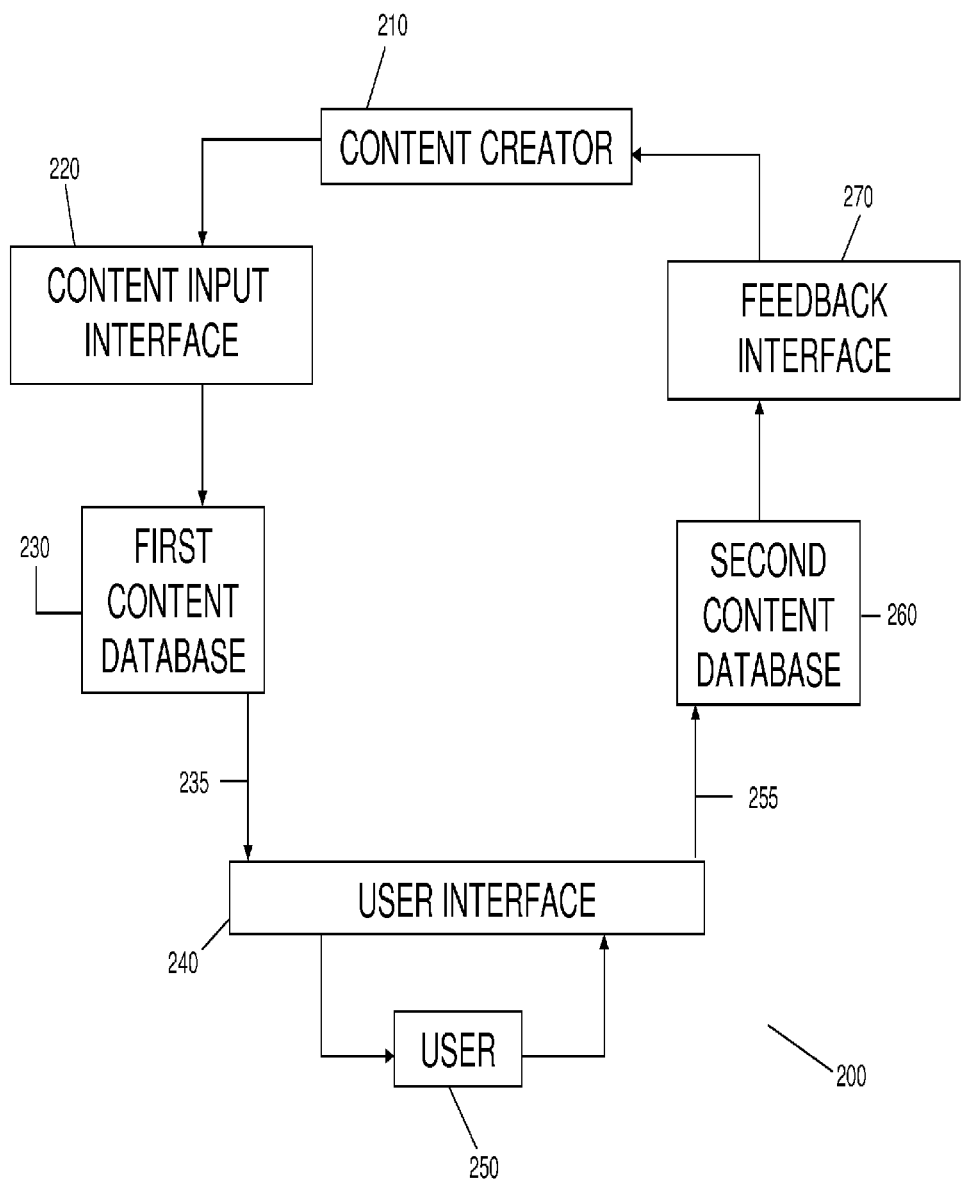
FIG. 2 is a block diagram of an embodiment of a method, implemented on an interactive entertainment system, for providing story enrichment to a game involving at least two discrete, independent stories that are interactively intertwined.

Referring to FIG. 2, in another embodiment of the invention, a method 200 implemented on an interactive entertainment system, for providing a user with one or more of at least two discrete, independent stories that are interactively intertwined and that include story enrichment in a multi-story game is shown. The method facilitates user-generated story enrichment regarding the plot, the character(s) and other issues related to each story, wherein the user feedback (whether in the form of communication units in written, visual, auditory or some other sensory format related to a character or a story, in the form of responses to polls and quizzes or similar communication units that can be aggregated or in the form of personalized user participation such as a virtual purchase or user embellishment of the user's avatar) is transmitted to the content creator who then processes the user feedback as appropriate to the type of feedback and who may also modify the plot, the character(s) and other issues related to that story in response to the user feedback.

According to the method, a content creator 210 provides plot-advancing and other communication units about one or more characters in at least one of at least two discrete, independent stories that are interactively intertwined in a game to a first content database 230 via a content input interface 220. The first content database 230 is used for storing and distributing the communication units to a user 250 of the game. The plot-advancing and other communication units about one or more characters in at least one of at least two discrete, independent stories that are interactively intertwined are transmitted from the first content database 230 to the user via a user interface 240 (which will vary depending on the medium through which the communication units are transmitted to and from the user) through a communication line 235 between the first content database 230 and the user interface 240.

The method 200 further provides for a user 250 to provide feedback regarding the game, such as, for example, communication units in written, visual, auditory or some other sensory format related to a character or a story; responses to polls and quizzes or similar communication units that can be aggregated; or personalized user participation such as a virtual purchase or user embellishment of the user's avatar or any other information or user reaction, the user 250 may transmit regarding the game. The feedback from the user 250 is transmitted via a user interface 240 to a second content database 260 though a communication line 255 between the user interface 240 and the second content database 260. The user feedback is then transmitted to the content creator 210 from the second content database 260 via a feedback interface 270. The content creator 210 can then review the user feedback and respond in one or more of the following ways: (a) evaluate, and possibly edit the feedback provided and potentially add enrichment to the game, such as, for example, changes in a story's plot or, information about a character (in the case of user feedback in the form of communication units in written, visual, auditory or other sensory format related to a character or a story), (b) aggregate the user feedback in order to upload summary information (in the case of responses to polls and quizzes, for example), or (c) to implement (in the case of user feedback in the form of a virtual purchase or an embellishment of a user avatar, for example.) The content creator 210 then provides the relevant information based on the user feedback to the user 250 by enriching the interactive entertainment system in one or more of the three ways outlined above and then repeating the steps of the method 200 with the next communication unit of user feedback.

Further aspects of the invention may include contests related to the interactive entertainment system, with user's material being included as part of the multi-media content of the interactive entertainment system, such as, for example, original music or visuals produced for the contest. External prizes for users and contest winners may be provided, some of these coming from interactive entertainment system sponsors or partners. The contests may be collaborative efforts on partnering websites; they may be posted by the interactive entertainment system enterprise on social network sites; or there may be other formats for the contests, such as via text message or other communication media.

Users may also earn points for participating in polls and quizzes, for commenting on characters' blogs or for other types of participation in the interactive entertainment system. These points may provide further opportunities for participation such as, for example, the opportunity to make a virtual purchase or to embellish a user's avatar. Users may also receive an acknowledgement for the submission of the user feedback to the user interface. The acknowledgment may be from the content creator or one of the characters and may be, for example, an email, short micro-blog response, or a text message, thanking the user for their contribution to the interactive entertainment system. Users may be offered the opportunity to vote on fixed choice decisions, such as yes/no questions, relevant to the interactive entertainment system. In addition, users may be able to download interactive entertainment system music, including ring tones, and visuals, such as screensavers; and they may be offered the opportunity to purchase objects such as licensed character tee-shirts and totes from the interactive entertainment system website or from collaborating partner or sponsor websites.

It will be understood that various modifications may be made to the embodiments disclosed herein. Therefore, the above description should not be construed as limiting, but merely as exemplifications of the various embodiments of the present disclosure. Those skilled in the art will envision other modifications within the scope and spirit of the claims appended hereto.

What is claimed is:

1. An entertainment system for providing at least one enriched, interactive story to a user over a computing device, the system, comprising a processor, configured to:
   store at least one story comprising a plurality of communication units in a content database, wherein a portion of communication units correspond to one or more characters in the story and a portion of communication units correspond to one or more plots of the story, wherein the at least one story is uploaded, by a content creator, to the entertainment system via a content input interface;
   transmit a first character communication unit to a user from the content creator, wherein the first character communication unit presents to the user as a first person communication from a first story character to the user or to a second story character;
   receive a user communication unit related to the at least one story from the user via a user interface;
   provide the received user communication unit to the content creator via a feedback interface; and
   transmit at least one communication unit in response to the received user communication unit to the user from the content creator.

2. The entertainment system of claim 1, wherein the user communication unit is selected from the group consisting of a communication with the one or more characters in at least one of the stories, a communication with one or more other users, commentary regarding the one or more characters or the one or more plots, and participation in a poll or quiz.

3. The entertainment system of claim 1, wherein the at least one communication unit is a second character communication unit sent to the user from the content creator.

4. The entertainment system of claim 3, wherein the second character communication unit is sent through a personalized medium directly to the user.

5. The entertainment system of claim 1, wherein the at least one communication unit is a story enrichment unit that modifies a plot or a character of the at least one story.

6. The entertainment system of claim 1, wherein the system is further configured to provide the received user communication unit to at least one other user.

7. The entertainment system of claim 6, wherein the received user communication unit is modified by the content creator prior to the system providing the received user communication unit to the at least one other user.

8. The entertainment system of claim 1, wherein the system is configured to transmit the plurality of communication units from the content creator via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

9. The entertainment system of claim 1, wherein the system is configured to transmit the user communication unit from the user via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

10. The entertainment system of claim 1, wherein the plurality of communication units are repeatedly provided to the user.

11. The entertainment system of claim 1, further configured to send a reward point to the user based on the received user communication unit, wherein the reward point is redeemable on the entertainment system.

12. A method, implemented on an entertainment system, for presenting at least one enriched, interactive story, the method comprising the steps of:
   uploading, by a content creator, at least one story via a content input interface, wherein the at least one story comprise a plurality of communication units, wherein a portion of communication units correspond to one or more characters in the story and a portion of communication units correspond to one or more plots of the story;
   storing the plurality of communication units related to the at least one story in a content database;
   transmitting a first character communication unit to a user from the content creator, wherein the character communication unit presents to the user as a first person communication from a first story character to the user or to a second story character;

receiving a user communication unit related to the at least one story from the user via a user interface;

providing the received user communication unit to the content creator via a feedback interface; and transmitting at least one communication unit in response to the received user communication unit to the user from the content creator.

13. The method of claim 12, wherein the user communication unit is selected from the group consisting of a communication with the one or more characters in at least one of the stories, a communication with one or more other users, commentary regarding the one or more characters or the one or more plots, and participation in a poll or quiz.

14. The method of claim 12, wherein the at least one communication unit is a second character communication unit sent to the user from the content creator.

15. The method of claim 14, wherein the second character communication unit is sent through a personalized medium directly to the user.

16. The method of claim 12, wherein the at least one communication unit is a story enrichment unit that modifies a plot or a character of the at least one story.

17. The method of claim 12, further comprising providing the received user communication unit to at least one other user.

18. The method of claim 17, wherein the received user communication unit is modified by the content creator prior to providing the received user communication unit to the at least one other user.

19. The method of claim 12, wherein from the content creator transmits the plurality of communication units via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

20. The method of claim 12, wherein the user transmits the user communication unit via at least one medium selected from the group consisting of: a cell phone text message, a visual cell phone transmission, a cell phone voice transmission, a land line voice transmission, a blog posting on a webpage, a micro-blog posting on a webpage, a written, visual, audio or video posting on a webpage, participation in an interactive activity on a webpage, a posting on a social networking website, a video transmitted by a television channel, and an audio transmission transmitted by a television channel or by a radio channel.

21. The method of claim 12, wherein the plurality of communication units are repeatedly provided to the user.

22. The method of claim 12, further comprising sending reward points to the user based on the received user communication unit, wherein the reward points are redeemable on the entertainment system.

\* \* \* \* \*